US006523081B1

United States Patent
Karlsson et al.

(10) Patent No.: US 6,523,081 B1
(45) Date of Patent: Feb. 18, 2003

(54) ARCHITECTURE USING DEDICATED ENDPOINTS AND PROTOCOL FOR CREATING A MULTI-APPLICATION INTERFACE AND IMPROVING BANDWIDTH OVER UNIVERSAL SERIAL BUS

(75) Inventors: Magnus G. Karlsson, McKinney, TX (US); Michael J. Moody, McKinney, TX (US); Gregory Lee Christison, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/506,764

(22) Filed: Feb. 18, 2000

Related U.S. Application Data

(60) Provisional application No. 60/166,890, filed on Nov. 22, 1999.

(51) Int. Cl.[7] .......................... G06F 13/38; G06F 13/40
(52) U.S. Cl. ...................................... 710/305; 710/306
(58) Field of Search ................................ 710/305–317

(56) References Cited

U.S. PATENT DOCUMENTS

| | | | | |
|---|---|---|---|---|
| 6,122,676 A | * | 9/2000 | Brief et al. | 710/10 |
| 6,151,653 A | * | 11/2000 | Lin et al. | 710/305 |
| 6,157,975 A | * | 12/2000 | Brief et al. | 710/10 |
| 6,205,501 B1 | * | 3/2001 | Brief et al. | 710/100 |
| 6,311,294 B1 | * | 10/2001 | Larky et al. | 710/33 |
| 2001/0056513 A1 | * | 12/2001 | Ueda | 710/100 |

* cited by examiner

*Primary Examiner*—Rupal Dharia
(74) *Attorney, Agent, or Firm*—Pedro P. Hernandez; W. James Brady, III; Frederick J. Telecky, Jr.

(57) ABSTRACT

A USB function device (14) for coupling to a USB host (12). The USB function device (14) comprises circuitry (32) for providing a capability to the USB host, where the circuitry for providing a capability comprises an address space (VBUS). The USB function device (14) further comprises a USB interface circuit (30) coupled between the USB host and the circuitry for providing a capability to the USB host. The USB interface circuit (30) comprises a memory area (44, 106) comprising a write endpoint (106₂) accessible to the USB host for writing a plurality of bytes to the memory area via the write endpoint. The plurality of bytes comprise data information and protocol information. The write endpoint comprises an endpoint-type other than a control-type endpoint. The USB interface circuit also comprises circuitry for decoding (166) the protocol information and circuitry for communicating the data information to the address space in response to the protocol information.

38 Claims, 8 Drawing Sheets

ARCHITECTURE USING DEDICATED ENDPOINTS AND PROTOCOL FOR CREATING A MULTI-APPLICATION INTERFACE AND IMPROVING BANDWIDTH OVER UNIVERSAL SERIAL BUS

CROSS-REFERENCES TO RELATED APPLICATIONS

This application claims the benefit, under 35 U.S.C. §119(e)(1), of U.S. Provisional Application No. 60/166,890 (TI-29866PS), filed Nov. 22, 1999, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to universal serial bus ("USB") systems, and are more particularly directed to increasing the rate and flexibility of communications between a USB host and a peripheral.

USB is a recently-developed technology established by a joint effort of various companies. The joint-effort produced a USB Specification, Revision 1.1, Sep. 28, 1998, which is hereby incorporated herein by reference and which governs many aspects about USB systems. The USB Specification is directed to a goal of improving the user-friendliness of various aspects of computers and the peripheral devices typically used with such computers. Particularly, in a USB system, various devices connected in the prior art to a computer via either internal buses or often different external connectors are now coupled, using a USB cable, to a common USB bus. The USB bus is mastered by a USB host in a manner that requires little or no configuration by the user. Various benefits arise in USB, including the ability to add devices to, or remove devices from, a USB system while the system is operating. As another benefit, USB easily integrate various functions such as raw data, voice data, and video data. These benefits are also achieved without requiring add-on cards, and through a single protocol that supports serial data transfers between a USB host and USB-operable peripherals simply by coupling those peripherals to a common USB bus. Still further, the ability to quickly and easily connect and disconnect devices provides considerable flexibility and possible cost reduction in comparison to many contemporary systems.

While USB systems provide the various benefits set forth above, the present inventors have recognized a drawback in USB systems in that control data throughput for such systems may be necessarily constrained due to the USB Specification. For example, the USB Specification requires that USB data packet transfers fall into one of four data categories, one of which is a control data category. The Specification imposes constraints and/or overhead on control data for communications of that data between a host and the so-called endpoint in a USB device coupled to the USB bus. In view of these limitations, there arises a need to improve the efficiency of data communication in USB systems, as is achieved by the preferred embodiments described below.

BRIEF SUMMARY OF THE INVENTION

In the preferred embodiment, there is a USB function device for coupling to a USB host. The USB function device comprises circuitry for providing a capability to the USB host, where the circuitry for providing a capability comprises an address space. The USB function device further comprises a USB interface circuit coupled between the USB host and the circuitry for providing a capability to the USB host. The USB interface circuit comprises a memory area comprising a write endpoint accessible to the USB host for writing a plurality of bytes to the memory area via the write endpoint. The write endpoint comprises an endpoint-type other than a control-type endpoint. The plurality of bytes comprises data information and protocol information. The USB interface circuit also comprises circuitry for decoding the protocol information and circuitry for communicating the data information to the address space in response to the protocol information.

In additional aspects of the preferred embodiment, the USB interface circuit comprises a second memory area comprising a read endpoint accessible by the USB host for reading a second plurality of bytes from the second memory area via the read endpoint. Further in this regard, the USB interface circuit comprises circuitry for inserting into the second plurality of bytes second protocol information to be read by the USB host. Still further, this USB interface circuit comprises circuitry for including data information in the second plurality of bytes to be read by the USB host. The data information in the second plurality of bytes is from the address space.

In yet additional aspects of the preferred embodiment, the USB interface circuit comprises a memory area comprising an interrupt endpoint accessible by the USB host for reading interrupt information via the read endpoint. Further in this embodiment, the USB interface circuit comprises circuitry for inserting the interrupt notification into the interrupt endpoint.

Other circuits, systems, and methods are also disclosed and claimed.

BRIEF DESCRIPTION OF THE SEVERAL VIEWS OF THE DRAWING

FIG. 1b illustrates an electrical diagram of the USB hierarchy of connections between the devices of FIG. 1a.

DETAILED DESCRIPTION OF THE INVENTION

Figure 1A:
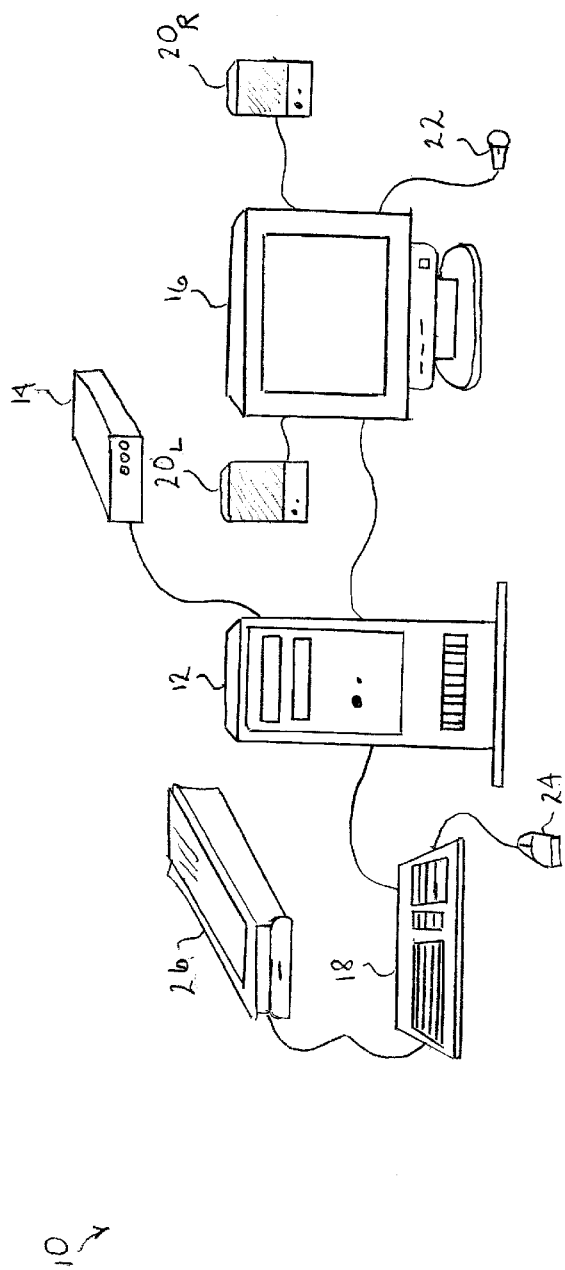
FIG. 1a illustrates a USB system including a personal computer as a USB host and various USB functions coupled to the USB host.

FIG. 1a illustrates an exemplary USB system 10 in which the preferred embodiments may be implemented. By way of introduction, system 10 includes aspects known in the USB art and further includes the preferred embodiments. To appreciate the USB context as improved by the preferred embodiments, the following discussion first explores system 10 as it relates to USB aspects in general, while a later discussion focuses on the improvements as relating to the preferred embodiments. System 10 includes a USB host 12 which, in the present example, is a personal computer ("PC"). USB host 12 includes a motherboard (not separately shown) which communicates with USB software that automatically loads device drivers in a manner that is typically transparent to the user of the PC, where the drivers support the remaining devices external from USB host 12. As further detailed later in connection with FIG. 1b, for purposes of USB communications these remaining devices may be directly connected to USB host 12, or may be coupled to USB host 12 through other devices shown in FIG. 1a. More particularly, in system 10 the devices that are directly connected to USB host 12 include an external modem 14, a monitor 16, and a keyboard 18. In contrast, the remaining devices in system 10 are coupled to USB host 12 via devices that are directly connected to USB host 12. For example, a set of speakers $20_L$ and $20_R$ are connected to monitor 16 and, thus, speakers $20_L$ and $20_R$ are coupled to USB host 12 via monitor 16. Similarly, a microphone 22 is also connected to monitor 16 and is thereby coupled to USB host 12. Completing the illustration, keyboard 18 is further connected to a mouse 24 as well as a scanner 26 and, thus, both mouse 24 and scanner 26 are coupled to USB host 12 via keyboard 18. Lastly, while in system 10 each of the illustrated devices is a USB device, in an alternative computer-based system only a subset of the total system devices may be USB-compatible.

The operation of system 10 includes numerous aspects known in both the general-purpose computer and USB arts. As to the former, an extensive detailed discussion is not presented in this document because the preferred embodiments are particularly directed to USB aspects; briefly it may be appreciated that each of the devices in system 10 operates to perform the known functionality for such a device and with scanner 26, and microphone 22, data communication to and from a remote location via modem 14, and data presentation by monitor 16 and speakers $20_L$ and $20_R$. The USB operations of system 10 are detailed throughout the remainder of this document.

Figure 1B:
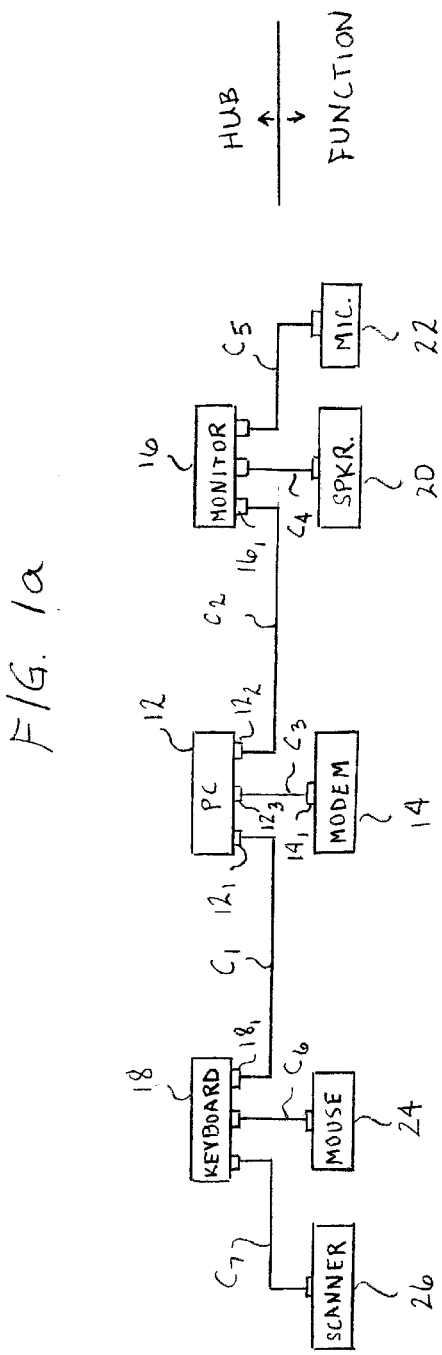

FIG. 1b illustrates an electrical diagram of the USB hierarchy of connections between the devices of FIG. 1a. As shown by a legend toward the right of FIG. 1b, each device in the upper half of FIG. 1b is referred to in the art as a hub and, thus, the hubs in system 12 include USB host 12 (i.e., the PC), keyboard 18, and monitor 16. In a USB system, the system includes a single USB host (e.g., host 12) which also serves as a hub, where the hub and any other hub in system 10 is a wiring concentrator for connecting to other USB devices, that is, it permits multiple attachments to other respective devices. To facilitate such connections, each hub includes at least one port through which it is connected either directly to the USB host or to another hub, where the connections are achieved using USB cables. Each USB cable includes four conductors, two for providing power to a USB device if the device does not obtain power via some other source, and two for data communications. The connectors on each end of a USB cable differ from one another so as to ensure that a proper end of the cable is connected in the so-called "upstream" direction toward USB host 12 while, naturally, therefore ensuring that the opposite end is connected in the so-called "downstream" direction away from USB host 12. Looking to the connections of the hubs in system 10, USB host 12 is connected from a port $12_1$, via a USB cable $C_1$, to a port $18_1$ of keyboard 18, and from a port $12_2$, via a USB cable $C_2$, to a port $16_1$ of monitor 16. As also shown by the FIG. 1b legend, each device in the lower half of the FIG. is referred to in the art as a function, although in less precise usages sometimes such devices are referred to as peripherals. A function is a USB device that provides a capability to the host. In the present example, therefore, the functions include microphone 22, speakers 20, modem 14, mouse 24, and scanner 26. In addition, a hub also may serve as a function and, indeed, in system 10, each of monitor 16 and keyboard 18 is an example of a device that is both a hub and a function. Each of the functions is also connected via a corresponding USB cable to a hub. For example, a cable $C_3$ connects modem 14, via a port $14_1$, to USB host 12 via its port $12_3$. The remaining cable connections in system 10 will be readily ascertainable by one skilled in the art.

The general prior art operation of system 10 with respect to USB functionality is now further explored. USB host 12 operates in a master/slave relationship relative to each of the functions, where USB host 12 always serves as the master and each of the functions always serves as a slave. Further in this regard, USB host 12 includes a serial interface engine ("SIE") (not separately shown) that is typically incorporated into a USB controller also included with the host so that USB host 12 may communicate serial information between itself and the functions. Particularly, the serial data passes along the data conductors in the cables shown, where typically the communications at the data conductor level are referred to as USB communications along a USB bus. To facilitate its master operations, USB host 12 generally includes three software levels which, from highest to lowest are: (1) a host controller driver which links whatever specific type of device that is chosen as a USB host controller to the remaining USB software structure; (2) USB system software that communicates between the host controller driver and client software; and (3) client software which is associated with a particular function and is often provided by the manufacturer of the function so that USB host 12 may communicate with and receive the functionality of that function. Given its software levels, USB host 12 monitors the network created by the connections of system 10, and detects when a function is added to that network (or removed from that network). More particularly, upon attachment of a function to the network, USB host 12 as master detects the added function, and its communication speed, in response to a resistance change due to one or more resistors connected inside the function and which thereby change the resistive load when a USB cable is connected to that function. In response, USB host 12 electrically configures a port connection to the newly-added function. Next, USB host 12 interrogates the function in connection with a four-step process, referred to in the art as enumeration, to identify information about the function and to assign a unique address to the function. Also in connection with this process or thereafter, USB host 12 may configure the function. Finally, USB host 12 loads the appropriate driver to communicate with the function, and thereafter USB communications may proceed according to a USB protocol discussed below.

The USB protocol divides the time of communication along the USB bus into one millisecond frames. During each frame the bandwidth is shared among all devices connected to the USB bus, and each frame is subdivided into one or more packets. The use and length of packets are constrained according to various criteria set forth in the USB Specification. In general, USB host 12, as master, begins each frame by communicating a start of frame ("SOF") packet. Thereafter, communications during the frame occur according to a token protocol, that is, a transaction between host and a function occur in response to the issuance of a token followed by an order of response. Thus, USB host 12 sends a token packet which includes an address directed to one of the functions, as well as an indication of whether the data to be communicated is a read (i.e., from the addressed function to USB host 12) or a write (i.e., from USB host 12 to the addressed function). The address specifically identifies what is referred to in the USB art as an endpoint (or "device endpoint"), which is a uniquely addressable portion of a USB function that is the source or sink of information in a communication flow between the USB host and the function. The endpoint gets its name from the fact that it is typically a location in a first-in-first-out ("FIFO") memory space of the function, so for data written to the function it is written to the end, or endpoint, of a write FIFO whereas for data read from the function it is read from the end, or endpoint, of a read FIFO. Returning to the token operation, when the token reaches the addressed function, that function decodes the address and identifies itself as the destination. Next, one or more data packets are communicated along the network, where the destination function acts accordingly (i.e., either receives or transmits the data). Finally, once the data communication is complete, the recipient of the data issues a handshake packet to indicate whether the transmission was successful. This handshake indication may be either a positive acknowledgment ("ACK") or a negative acknowledgment ("NAK"). Further, in the case of a function as a data recipient, the function may provide a handshake indication of a STALL where either the intended endpoint is halted or a control request is not supported.

The USB Specification requires that USB data packet transfers fall into one of four data categories: (1) control data transfers; (2) bulk data transfers; (3) interrupt data transfers; and (4) isochronous data transfers. Each of these transfer types is detailed below. Before reaching that discussion, and by way of contrast to the preferred embodiment detailed below, it is noted that in the prior art each of these transfer types is to a like kind of endpoint. Further, in the art and as a logical construct, each such communication is referred to as along a pipe to the endpoint. For example, if a host communicates an isochronous data packet to a function, then it more particularly communicates it to an isochronous-type endpoint in the function and the communication is said to be along a pipe to that endpoint. Similarly, if a host communicates a bulk-type data packet to a function, then it communicates it along a pipe to a bulk data endpoint in the function. One skilled in the art will appreciate the application of this terminology to the remaining data transfer and corresponding endpoint types. Finally, while not fully detailed herein, the USB Specification places different constraints on different ones of the data transfer types, such as the number of bytes permitted per packet and the number of packet per frame or for a given number of frames. Some of these constraints are discussed later in this document.

Control transfers allow USB host 12 to access different parts of a function, to obtain information about the function, and to change the behavior of the function. More particularly, control transfers support configuration, command, and status type communication flows between client software in USB host 12 and a function corresponding to that software. For example, control data is used by USB host 12 to configure a function when it is first attached to system 10. Further, each USB function is required to implement an IN control pipe, with a corresponding enpdoint 0, as a default control pipe which is used by the USB system software to write control information to the function. Each USB device is also required to have an OUT control pipe (and enpdoint) to output control information. The default IN control pipe provides access to information pertaining to a USB function such as its configuration, status, and control information. Further, the USB Specification defines requests that can be used to manipulate the state of a function, and descriptors are also defined that can be used to contain different information on the device. Finally, a function optionally may provide endpoints for additional control pipes for other implementation needs, such as to accommodate implementation-specific functionality provided via customer software on USB host 12.

Bulk transfers permit communication of relatively large data groups where the data may be communicated at highly variable times and the transfer may use any available bandwidth. Bulk transfers are unidirectional and, thus, a given transfer may be only from host to function or function to host; thus, if both directions are desired, then a function must have both an IN bulk-type endpoint and an OUT bulk-type endpoint or, alternatively, two pipes may be associated with the same endpoint. As examples of a bulk transfer, they may readily apply to data collection by scanner 26. Error detection is included in hardware and implements a limited number of retries for bulk data transfers so as to greatly enhance the likelihood of successful data delivery. However, a tradeoff for bulk data is that there is no guarantee against latency. Lastly, the amount of bandwidth per USB frame allotted to bulk data may vary depending on other bus demands arising from other data transfers by either the same or a different function.

Interrupt transfers are relatively small transfers to or from a USB function. Such data may be presented for transfer by a function at any time, but because USB host 12 is a master it cannot be interrupted. Instead, USB host 12 periodically polls each function and, in response to a notification that interrupt data has been posted, USB host 12 retrieves the interrupt information. Interrupt data typically consists of event notification, characters, or coordinates that are organized as one or more bytes. For example, interrupt data may be presented by keyboard 18 or mouse 24 (or some other pointing device).

Isochronous data is continuous and real-time in creation, communication, and use. Isochronous transfers are unidirectional and, thus, can be only from host to function or function to host; thus, if both directions are desired, then a function must have both an IN isochronous-type endpoint and an OUT isochronous-type endpoint (or two pipes associated with the same endpoint). Timing-related information is implied by the steady rate at which isochronous data is received and transferred. Isochronous data must be delivered at the rate received to maintain its timing. Isochronous data also may be sensitive to delivery delays. For isochronous pipes, the bandwidth required is typically based upon the sampling characteristics of the associated function. The latency required is related to the buffering available at each endpoint. A typical example of isochronous data would be real-time video information received by modem 14. Due to its real-time nature, the delivery rate of isochronous data must be maintained or else drop-outs in the data stream will occur. Isochronous communications are not corrected such as by hardware retries, with the benefit being that timely delivery is ensured (assuming no other latency, such as in software) while the drawback being that data communication may be lossy. In practice, the bit error rate of USB is predicted to be relatively small so that applications using the types of data being communicated as isochronous data are not appreciably affected in a negative manner. Lastly, USB isochronous data streams are allocated a dedicated portion of USB bandwidth to ensure that data can be delivered at the desired rate.

Figure 2:
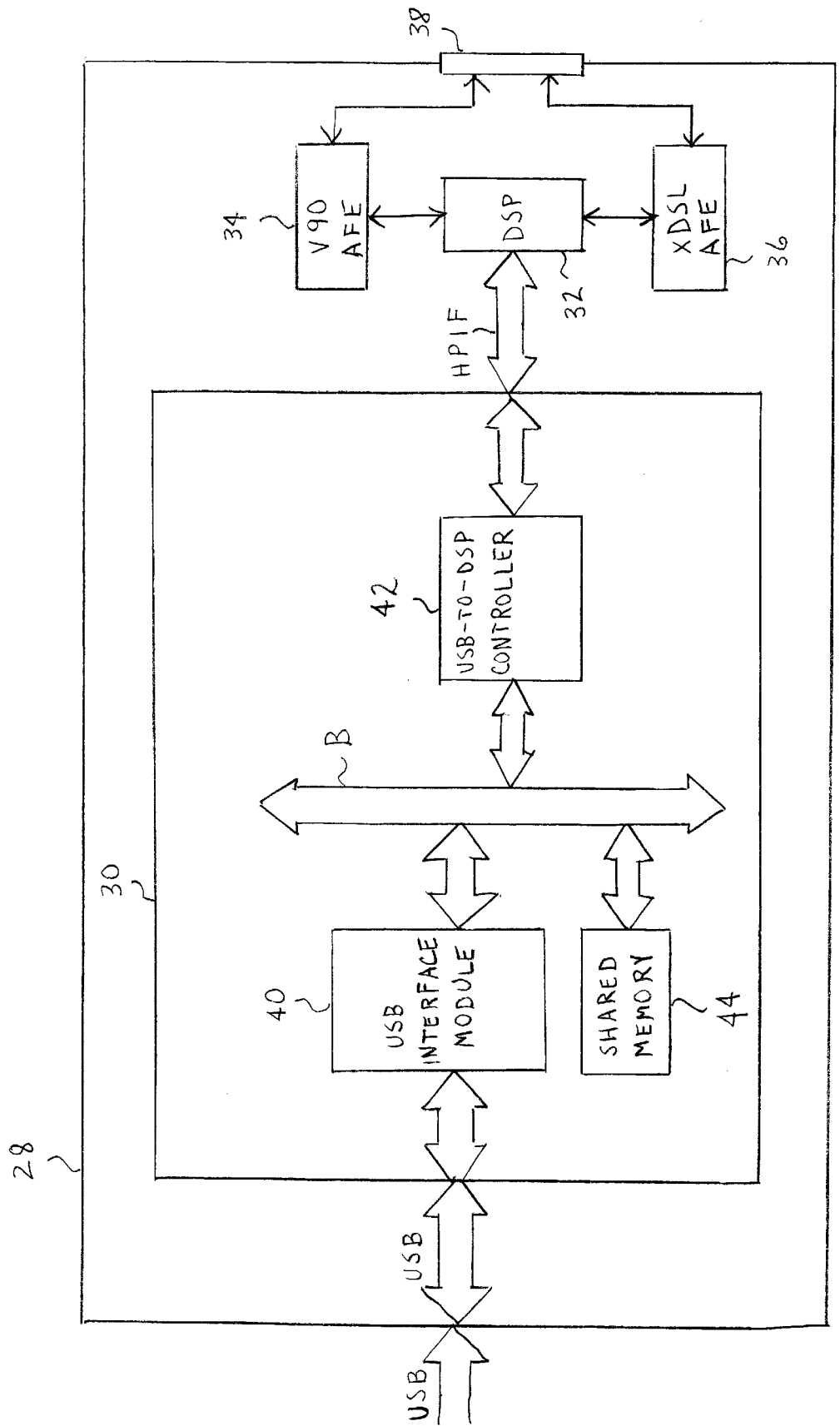
FIG. 2 illustrates a block diagram of a function card according to the preferred embodiment, where the function card provides various USB aspects and supports a hybrid modem function.

FIG. 2 illustrates a block diagram of a function card 28 according to the preferred embodiment. Function card 28 represents an electrical computer-type circuit board in general, and in FIG. 2 the blocks shown are those implemented in the preferred manner of forming modem 14 of FIGS. 1a and 1b; thus, function card 28 is intended to be enclosed within the external housing of modem 14 and connected electrically to the USB bus as known generally in the art. Further, while function card 28 includes various inventive aspects detailed below in the context of modem 14, one skilled in the art should appreciate that various of these aspects may apply to any one or more of the other functions in system 10. Lastly, by way of example and also for further introduction, in the preferred embodiment modem 14 is a hybrid modem serving both voice (e.g., V90) and xDSL communications.

Turning to certain connections of function card 28, to the left of FIG. 2 is shown the USB bus which, as introduced earlier, represents the two data conductors from a USB cable. In the present example of modem 14, therefore, the USB bus is the data conductors from cable $C_3$. The USB bus is coupled to a USB interface device 30 which, as detailed below, includes various other functional blocks that are formed using one or more integrated circuits. USB interface device 30 is further connected to an HPIF ("host port interface") bus which is further connected to a digital signal processor ("DSP") 32 or some other desirable processing circuit(s). By way of example, DSP 32 may be one of various types of DSPs commercially available from Texas Instruments Incorporated, such as the TMS320C6201, TMS320C6202, or TMS320C6205. Further with respect to these devices and bus HPIF coupling them to USB-to-DSP controller 42, the term "HPIF" in connection with bus HPIF is selected not as a limitation, but due to its association with the interface of the TMS320C6201 and TMS320C6202 (and TMS320C6205). Particularly, the interface of the TMS320C6201 is referred to in the art as a host port interface ("HPIF"), whereas the interface of the TMS320C6202 (and TMS320C6205) is referred to as an Xbus (extended bus). The Xbus supports various modes, one of which is a host port interface; thus, this optional mode may be selected to support the same HPIF as the TMS320C6201 and, for this reason, bus HPIF is named to reflect this mutual mode of the two DSPs. Further with respect to the interface of the TMS320C6x processors, note that the TMS320C6201 provides a 16-but bus while the TMS320C6202 (and TMS320C6205) provides a 32-bit bus. The preferred embodiment may accommodate either such interface by including a user configurable switch to allow either a 16-bit or 32-bit coupling to the interface. In any event with respect to bus HPIF, a different bus name and type may be used with other DSP or processing circuits. Continuing with DSP 32, it is further connected to two different analog front end ("AFE") circuits, namely, a V90 (i.e., voice) AFE 34 and an xDSL AFE 36. Each AFE 34 and 36 is connected to a physical connector 38 so that an appropriate cable (not shown) may connect function card 28 to a proper connection to support modem communications. Returning to USB interface device 30 and exarnling the blocks shown therein, the USB bus connects within USB interface device 30 to a USB interface module 40. USB interface module 40 is further connected to a bus B. Also connected to bus B is a USB-to-DSP controller 42, which is further connected to bus HPIF. Lastly, USB interface device 30 includes a shared memory 44 connected to bus B, and that is given its name because it is accessible by both USB interface module 40 and USB-to-DSP controller 42 via bus B. Further in this regard, shared memory 44 includes various locations reserved as USB endpoints, as detailed later.

A brief description of the operation of function card 28 is now presented, with further details presented later in connection with a more detailed examination of certain of the blocks shown therein. In general, function card 28 interfaces at both the physical and protocol levels with the USB system and, hence, permits communications between function card 28 and USB host 12. USB host 12 communicates data along the USB bus to function card 28, and that information is received by USB interface module 40 and processed according to principles known in the USB art. Further, USB interface module 40 may write transfers of any of the four above-described types to the endpoints in shared memory 44, where such information is written via bus B. USB-to-DSP controller 42 also may access the endpoints in shared memory 44 via bus B. Accordingly, given this access, data written to the endpoints from USB interface module 40 may be read by DSP 32 via bus HPIF or, alternatively, data written by DSP 32 to bus HPIF may be transferred by USB-to-DSP controller 42 to the endpoints in shared memory 44. Further in this regard, DSP 32 is programmed and configured to provide the general functionality supported as a USB function which, for the present example, is a modem functionality given that card 28 is associated with modem 14. Moreover, DSP 32 is programmed in this respect to support both voice and xDSL communications, and the two AFEs 34 and 36 provide electrical interfaces to and from DSP 32 further in this regard. DSP 32 also may be programmed to communicate with respect to USB-to-DSP controller 42 in various manners according to the preferred embodiments, as is discussed below.

Figure 3:
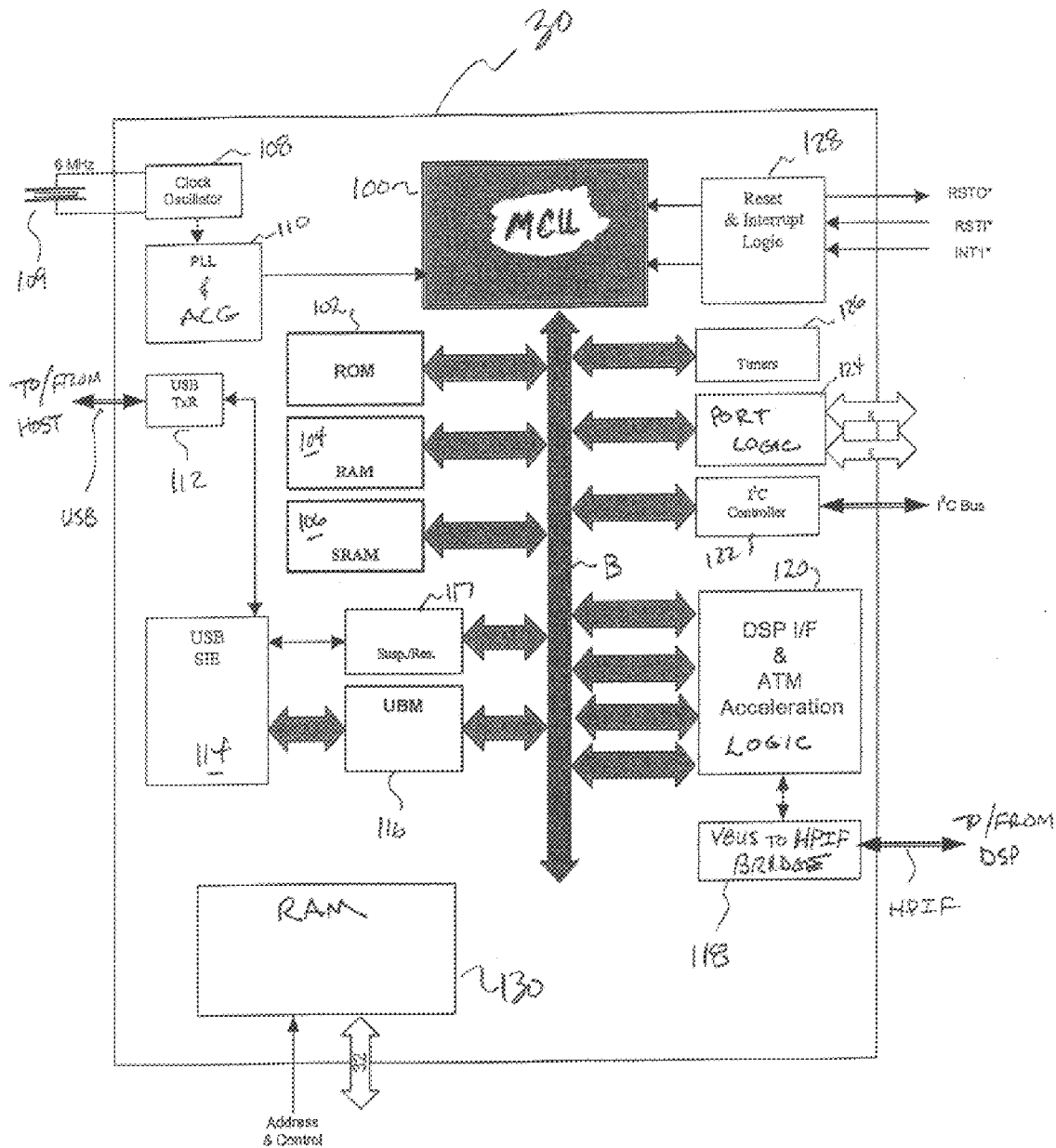
FIG. 3 illustrates the USB interface device 30 of FIG. 2 in greater detail.

Referring now to FIG. 3, an exemplary architecture of USB interface device 30 in modem 14 of FIG. 2, according to the preferred embodiment, is now described. Of course, USB interface device 30 may be constructed according to any one of a number of architectures and arrangements. As such, it is to be understood that the exemplary architecture illustrated in FIG. 3 and described herein is presented by way of example only.

USB interface device 30 of FIG. 3 includes functions similar to those provided by the TUSB3202 USB peripheral interface devices available from Texas Instruments Incorporated, and includes some common architectural features therewith. In this regard, USB interface device 30 includes microcontroller unit ("MCU") 100, which may be a standard 8052 microcontroller core. MCU 100 communicates with various memory resources over bus B, including program read-only memory ("ROM") 102, and random access memory ("RAM") banks 104, 106. RAM bank 104 is utilized primarily as code space that may be loaded from USB host 12 over the USB bus, or alternatively from another device over another one of the ports provided in USB interface device 30. As will be described in further detail below, synchronous RAM bank 106 ("SRAM 106") represents shared memory 44 from FIG. 2 and, thus, includes the USB endpoint buffers (although additional endpoints also may exist in RAM 104). MCU 100, as well as the other synchronous functions of USB interface device 30, are clocked at the appropriate clock rates by phase-locked loop ("PLL") and adaptive clock generator ("ACG") 110, which generates various frequencies divided down from a reference clock generated by oscillator 108 according to the frequency set by external crystal 109. PLL and ACG 110 preferably provide clocks suitable for supporting the available USB synchronization modes, including asynchronous, synchronous, and adaptive modes for isochronous endpoints.

For USB communications with USB host 12, USB interface device 30 includes USB transceiver 112, which preferably supports full speed (12 Mb/sec) data transfers, and includes a differential input receiver, a differential output driver, and two single ended input buffers. USB transceiver 112 is coupled to USB serial interface engine ("SIE") 114, which manages the USB packet protocol requirements for data transmitted and received by USB interface device 30 over the USB bus. In general, SIE 114 decodes packets received over the USB bus to validate and identify the packet identifier ("PID"), and generates the correct PID for packets to be transmitted over the USB bus. Other receive functions performed by SIE 114 include cyclic redundancy check ("CRC") verification, and serial-to-parallel conversion; for transmit, SIE 114 generates the CRC value and also effects parallel-to-serial conversion. SIE 114 bidirectionally communicates with USB buffer manager ("UBM") 116, which controls reads and writes of data from and to the appropriate USB endpoint buffers in RAM 104, 106. In this regard, UBM 116 decodes the USB function address in received packets to determine whether the packet is in fact addressed to USB interface device 30 itself, as well as decoding the endpoint address contained in the received packet (which may include a polling packet from USB host 12). Suspend and resume logic 117 is also provided for detecting suspend and resume conditions on the USB bus, and for controlling SIE 114 accordingly.

Other various functions are also provided within USB interface device 30. Inter-IC (I²C) controller 122 is coupled to bus B, and supports communications to and from other integrated circuits over a two-wire serial connection; for example, RAM 104 may be loaded from such an external integrated circuit over the I²C port, under the control of I²C controller 122. General purpose port logic 124 interfaces bus B to general purpose parallel input/output ports, numbering two in this example. Timers 126 provide one or more timer functions for controlling the operation of USB interface device 130. Reset and interrupt logic 128 monitors various interrupt and reset conditions, to provide interrupt and reset control for MCU 100. Additionally, extra internal memory is provided by asynchronous RAM 130, which is externally accessible, for example to DSP 32 by way of a dedicated RAM interface (and thus permitting reads and writes in a manner independently from and asynchronously with the USB functionality of USB interface device 30).

In addition to the USB interface functions described above, which are substantially common with the TUSB3202 USB peripheral interface devices available from Texas Instruments Incorporated, USB interface device 30 according to the preferred embodiment includes DSP interface and ATM acceleration logic 120, for processing data received from USB host 12 over the USB bus for application to DSP 32 by way of VBUS-to-HPIF bridge 118, and for conversely processing data received from DSP 32 before transmission to USB host 12 over the USB bus. The construction and operation of DSP interface and ATM acceleration logic 120 will be described in further detail below. VBUSto-HPIF bridge 118 supports reads and writes to on-chip memory of DSP 32 in either a sixteen bit or thirty-two bit mode.

Figure 4:
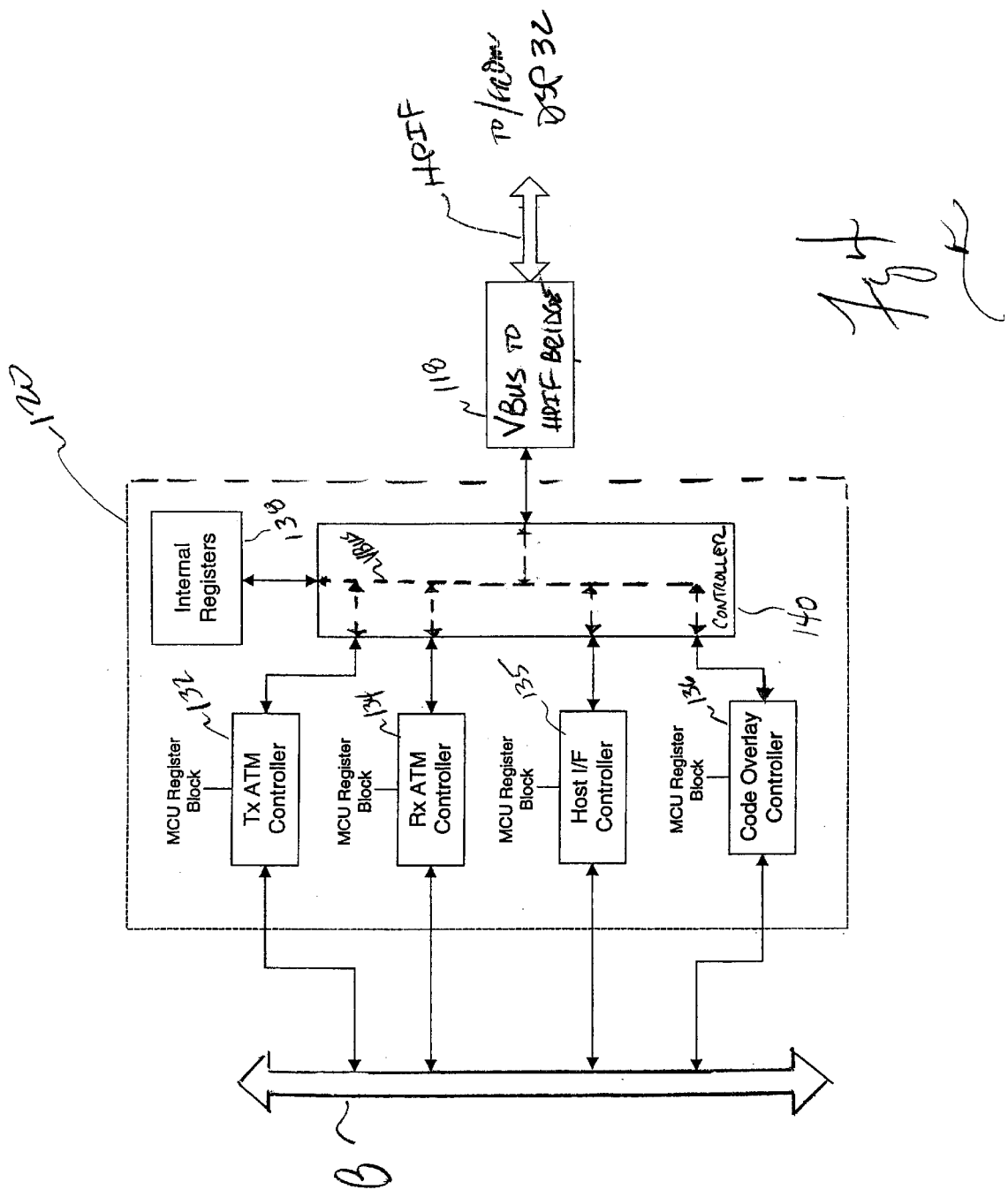
FIG. 4 illustrates the DSP interface and ATM Acceleration logic 120 of FIG. 3 in greater detail.

Referring now to FIG. 4, the construction of DSP interface and ATM acceleration logic 120 according to the preferred embodiment are now described. As shown in FIG. 4, multiple controllers within DSP interface and ATM acceleration logic 120 are coupled to bus B (FIG. 3). According to this embodiment, in which USB interface device 30 is implemented into modem 14, DSP interface and ATM acceleration logic 120 includes ATM transmit controller 132 and ATM receive controller 134, each of which is unidirectionally coupled to pass data from bus B to controller 140, and is utilized to carry out ATM communications processing, including such functions as segmentation and reassembly, respectively. Host interface controller 135 is bidirectionally coupled between bus B and controller 140, while code overlay controller 136 unidirectionally communicates data (corresponding to program instructions for DSP 32) from bus B to controller 140. Each of controllers 132, 134, 135, 136 also may communicate handshake signals between bus B and the respective controller. Further, according to the preferred embodiment, each of controllers 132, 134, 135, 136 includes an interface to MCU 100 (FIG. 3), by way of which controllers 132, 134, 135, 136 are configured to point to the corresponding assigned USB endpoint buffers in SRAM 106.

Controller 140 arbitrates access by controllers 132, 134, 135, 136 to bus VBUS (which appears as a "virtual" bus to devices external to USB interface device 30), and further permits access to the slaves to bus VBUS which consist of VBUS-to-HPIF bridge 118 and internal registers 138. Specifically, in response to one of controllers 132, 134, 135, 136 issuing a request to master bus VBUS, controller 140 operates to grant access to bus VBUS according to a corresponding bus protocol, after arbitration among competing bus requests. Further, internal registers 138 communicate with controller 140, as a slave on bus VBUS, for storing configuration information for DSP interface and ATM acceleration logic 120 and its functional modules. As noted above, endpoint buffer information is preferably configured internally to each of controllers 132, 134, 135, 136; the configuration information stored by internal registers 138 includes such other configuration and status information as appropriate for the operation of DSP interface and ATM acceleration logic 120.

VBUS-to-HPIF bridge 118 operates effectively as a bridge between the bus connected to DSP 32 and internal bus VBUS which, as noted above, is accessible to controllers 132, 134, 135, 136. For example, if the interface from USB interface device 30 to DSP 32 is by way of its host-port interface (HPIF), such as incorporated into the TMS320C6201 digital signal processor (DSP) available from Texas Instruments Incorporated, VBUS-to-HPIF bridge 118 operates effectively as a bridge to that interface, formatting and translating the communicated data signals from those on bus VBUS into a format appropriate for the bus protocol of the host-port interface.

Figure 5:
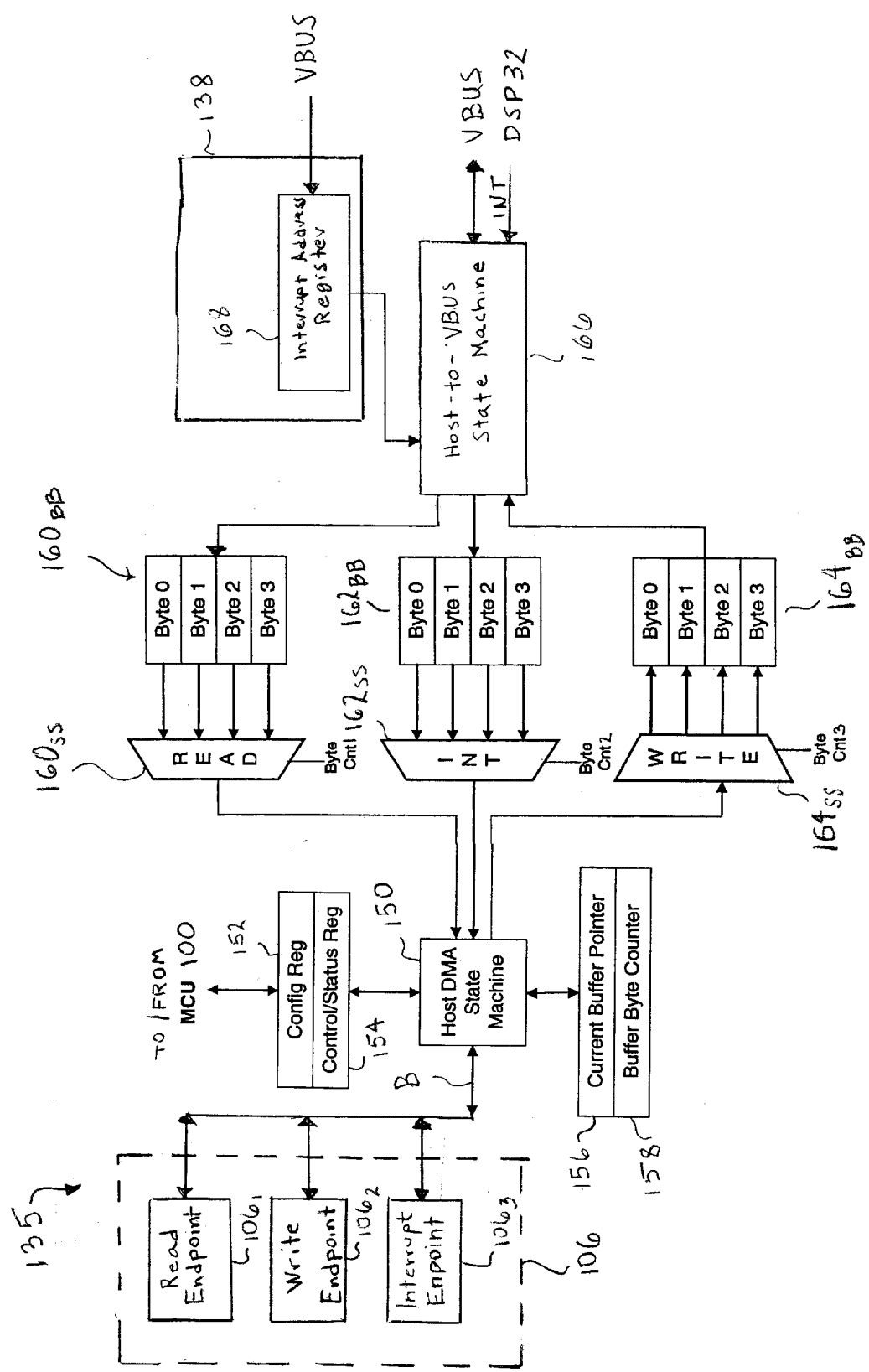
FIG. 5 illustrates the host interface controller 135 of FIG. 4 in greater detail.

FIG. 5 illustrates a block diagram of host interface controller 135 in greater detail, and further demonstrates particular aspects of the preferred embodiment. In general, host interface controller 135 serves as a soft interface between USB host 12 and DSP 32, that is, for those communications in FIG. 5 that are between bus B and bus VBUS. Further in this regard and as detailed below, host interface controller 135 services dedicated endpoints in shared memory 44 (FIG. 2, or SRAM 106 of FIG. 3), and which are accessible via bus B, where such access improves data throughput over that achieved by an implementation solely according to the USB Specification.

Turning to a first block in FIG. 5, host interface controller 135 includes a host DMA state machine 150 which is coupled to receive, from MCU 100, configuration information from a configuration register 152. In the preferred embodiment, the configuration information in register 152 comprises: (1) an enable bit; and (2) an endpoint descriptor block pointer. The enable bit, when set to an enable state, enables the functionality of host DMA state machine 150. The endpoint descriptor block pointer in the present embodiment includes three pointers to address locations in shared memory SRAM 106, where each of those addresses is the beginning of a different endpoint descriptor block, as further detailed below. Host DMA state machine 150 is also coupled to provide, to MCU 100, one or more bits in a control/status register 154, where these bits permit host DMA state machine 150 to inform or possibly interrupt MCU 100 if desired (e.g., if some type of data fault or exception occurs).

Host DMA state machine 150 is also coupled to bus B, thereby permitting access between it and three dedicated endpoints within SRAM 106 (FIG. 3, or shared memory 44 of FIG. 2). More particularly, at initial configuration host DMA state machine 150 reads the three endpoint descriptor block pointer addresses from configuration register 152, and then host DMA state machine 150 reads the endpoint descriptor blocks at the three pointer addresses. Further in this regard, the endpoint descriptor block read at each of the pointer addresses in SRAM 106 identifies various attributes about a corresponding dedicated endpoint also located in SRAM 106, including the address location of each endpoint, the total storage capacity of an endpoint, and the number of valid data bytes stored in the endpoint. The three dedicated endpoints which are described in this manner by endpoint descriptor blocks include a host read endpoint $106_1$, a host write endpoint $106_2$, and an interrupt endpoint $106_3$. In the preferred embodiment, each of the dedicated endpoints $106_1$, $106_2$ and $106_3$ is a bulk-type endpoint. Additionally, read endpoint $106_1$ and write endpoint $106_2$ are 64-byte endpoints, meaning up to 64 bytes may be written to one of these endpoints in a given stream of bytes. Further, however, this 64-byte capacity is duplicated so that each endpoint $106_1$ and $106_2$ is formed using two buffers, referred to as an X buffer and a Y buffer, where each buffer can store up to 64 bytes. Further in this regard, the beginning address portion in each endpoint descriptor block therefore identifies both an address of an X buffer and an address of a Y buffer for the corresponding endpoint. The dual-buffer structure of an endpoint permits the writing of one such buffer at the same time the other buffer is being read. Interrupt endpoint $106_3$ is an 8-byte endpoint, and also is formed using an X and Y buffer, where here each such buffer can store up to 8 bytes and only one or the other buffer can be written at one time. Host DMA state machine 150 is also coupled to a current buffer pointer 156 and a buffer byte counter 158. Current buffer pointer 156 stores three pointers corresponding to respective endpoints $106_1$, $106_2$, and $106_3$, where each such pointer may point to either the X or Y buffer for the respective endpoint. Buffer byte counter 158 is for tracking the number of valid bytes in either the X or Y buffer for each respective endpoint, where the initial number of such bytes for a given transfer to or from endpoints $106_1$, $106_2$, and $106_3$ is written to buffer byte counter 158 by either UBM 116 or host DMA state machine 150, as further detailed later.

Host interface controller 135 also includes three sets of byte buffers, namely, a read byte buffer $160_{BB}$, an interrupt byte buffer $162_{BB}$, and a write byte buffer $164_{BB}$, and each byte buffer is connected to a respective selection circuit $160_{SS}$, $162_{SS}$, and $164_{SS}$. Each byte buffer $160_{BB}$, $162_{BB}$, and $164_{BB}$ is configured to store up to four bytes of information at one time, and the information of each buffer corresponds to one of the dedicated endpoints $106_1$, $106_2$, and $106_3$. Specifically, a read byte buffer $160_{BB}$ may store up to four bytes of information corresponding to host read endpoint $106_1$, a write byte buffer $164_{BB}$ may store up to four bytes of information corresponding to host write endpoint $106_2$, and an interrupt byte buffer $162_{BB}$ may store up to four bytes of information corresponding to interrupt endpoint $106_3$. Each selection circuit $160_{SS}$, $162_{SS}$, and $164_{SS}$ is connected based on the directionality intended to transmit the information corresponding to the selection circuit, as is further explained below.

Host interface controller 135 also includes a host-to-VBUS state machine 166 coupled between byte buffers $160_{BB}$, $162_{BB}$, and $164_{BB}$ and bus VBUS. In the preferred embodiment, host-to-VBUS state machine 166 includes one or more state machines for purposes of operating according to a host interface protocol of the preferred embodiment, detailed later, and for communicating data between bus VBUS and byte buffers $160_{BB}$, $162_{BB}$, and $164_{BB}$. More particularly, host-to-VBUS state machine 166 may transmit information to either read byte buffer $160_{BB}$ or interrupt byte buffer $162_{BB}$, and may receive information from write byte buffer $164_{BB}$. Returning briefly now to the connection between a byte buffer and its corresponding selection circuit, the additional connections are now appreciated given the direction of information as introduced with respect to host-to-VBUS state machine 166. For example in the direction from bus VBUS toward bus B and looking to read byte buffer $160_{BB}$, each of its four bytes is connected as an input to selection circuit $160_{SS}$, and in response to a byte count signal (i.e., Byte Cnt1) selection circuit $160_{SS}$ may choose any one of those four bytes and output it to host DMA state machine 150. Similarly for interrupt byte buffer $162_{BB}$, each of its four bytes is connected as an input to selection circuit $162_{SS}$, and in response to a byte count signal (i.e., Byte Cnt2) selection circuit $162_{SS}$ may choose any one of those four bytes and output it to host DMA state machine 150. Write byte buffer $164_{BB}$, however, and its corresponding selection circuit $164_{SS}$, are oriented in the opposite data path direction. Thus, with respect to write byte buffer $164_{BB}$, each of its four bytes is connected as an output from selection circuit $164_{SS}$, and in response to a byte count signal (i.e., Byte Cnt3) selection circuit $164_{SS}$ may output data to any one of those four bytes which is then provided to host-to-VBUS state machine 166. Lastly, host-to-VBUS state machine 166 is connected to receive an interrupt signal INT from DSP 32, and further in this regard is connected to receive an address from an interrupt address register 168. The address in interrupt address register 168 is written thereto at start-up, and it identifies a location of a status register of DSP 32 (preferably, a soft register in the memory space of DSP 32) for reasons detailed later.

Figure 6:
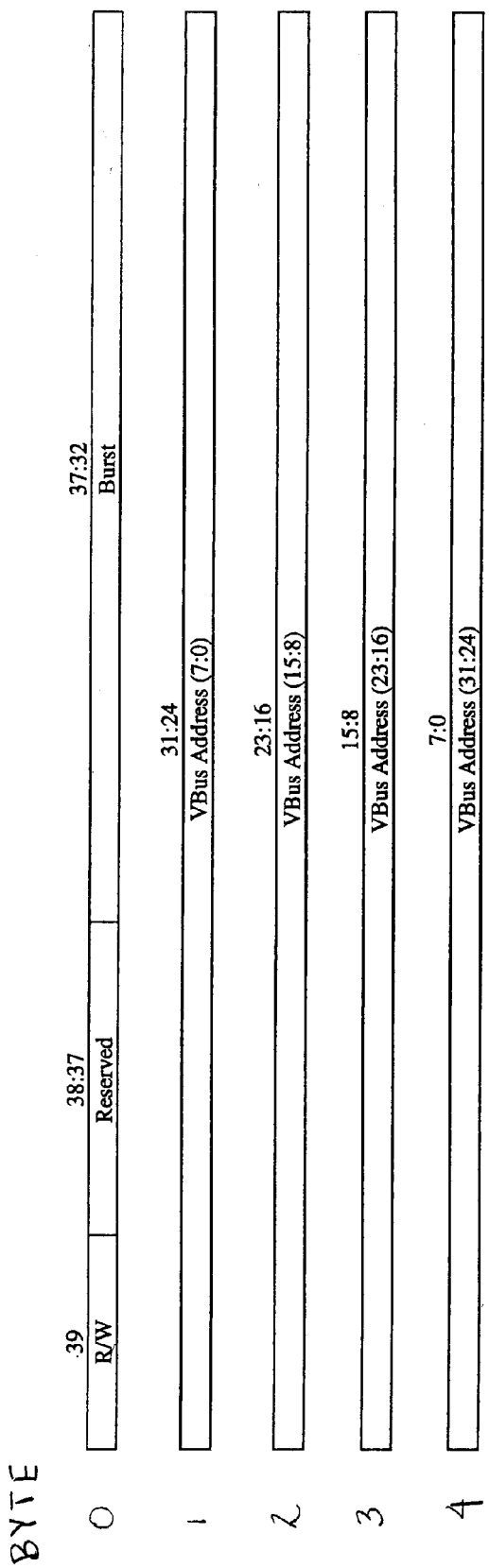
FIG. 6 illustrates the format of a preferred host interface protocol header for communications between USB host 12 and the read and write dedicated endpoints of host interface controller 135.

The operation of host interface controller 135 is better understood by first exploring a preferred host interface protocol header shown in FIG. 6. By way of introduction, the preferred host interface protocol header is a number of bytes used to govern packet transmissions between USB host 12 and either read endpoint $106_1$ or write endpoint $106_2$ (i.e., but not interrupt endpoint $106_3$) by including the protocol header at the beginning of each packet communicated between USB host 12 and these two endpoints. The protocol header of the preferred embodiment includes five bytes of information, numbered byte 0 through byte 4 in FIG. 6.

Byte 0 of the preferred embodiment host interface protocol header includes a one-bit read/write field, two reserved bits, and a six-bit data burst size field. The read/write and data burst fields are discussed below.

The read/write field indicates the direction of intended data transmission with respect to USB host 12. A write indication (e.g., R/W=0) indicates that USB host 12 is requesting that host interface controller 135 perform a slave write operation into the memory-mapped address space of bus VBUS, meaning all devices that are addressable via bus VBUS (e.g., DSP 32, internal registers 138, VBUS-to-HPIF bridge 118). Thus, when USB host 12 seeks to write a block of data to the memory-mapped address space of bus VBUS via host interface controller 135, then USB host 12 precedes the block of data with the protocol header of FIG. 6, and in byte 0 of that header it sets the read/write field to indicate a write. A read indication (e.g., R/W=1) indicates that USB host 12 is requesting that host interface controller 135 perform a slave read operation from the memory-mapped address space of bus VBUS. When USB host 12 seeks to read a block of data from the memory-mapped address space of bus VBUS via host interface controller 135, then USB host transmits a read request to host interface controller, and that request consists solely of the protocol header of FIG. 6, where in byte 0 of that request USB host 12 sets the read/write field to indicate a read. Lastly, and as detailed later, when host interface controller 135 is returning data to USB host 12 in response to a read request from USB host 12, then host interface controller 135 also sets the read/write field to indicate a read.

The six-bit data burst size field indicates the number of data bytes that will follow the five-bytes shown in FIG. 6 in the same packet that begins with those five bytes. More particularly in this regard, in the preferred embodiment and as also described later, up to 32 bytes of data may follow a single protocol header in a communication between USB host 12 and either read endpoint 106₁ or write endpoint 106₂. Thus, for a given communication, the actual number of data bytes following the header in this manner is specified in the data burst size field. While the data burst size field is six bits, in the preferred embodiment a value of 000000 indicates a burst size of one data byte and, hence, the maximum burst size of data bytes supported by the field is 32 bytes.

Bytes 1 through 4 of the preferred embodiment host interface protocol header provide a 32-bit value identifying an address on bus VBUS and corresponding to either the data write or the data read. For example, when USB host 12 is writing to the device (e.g., modem 14) including host interface controller 135, then USB host 12, preferably via its client software, inserts into the present protocol header the address at bus VBUS to which the first data word in the burst is to be written. This address then may be translated by VBUSto-HPIF bridge 118 and the data written to the memory space of DSP 32 according to the translated address. In the opposite data direction, when a packet of burst data is to be read by USB host 12 from host interface controller 135, bytes 1 through 4 at the beginning of that packet identify the address of bus VBUS from which that data was provided, and VBUS-to-HPIF bridge 118 will obtain this data from the memory space of DSP 32 and provide it to USB host 12 as further detailed below.

The operation of host interface controller 135 is now examined in greater detail, and is further explored below using additional Figures. At this point by way of introduction to such Figures, the operation is as follows. Generally, USB host 12 communicates with the capability provided by a function and, in the present embodiment, such capability is provided via DSP 32. Applying this overall communication to host interface controller 135, it interfaces between USB host 12 and DSP 32, using the preferred protocol header of FIG. 6 for reads and writes, and further permitting an interrupt of either of those activities. Accordingly, host interface controller 135 effectively inserts into a USB function an emulation of direct communication between USB host 12 and the processing circuit of the function (e.g., DSP 32), where the emulation provides a read/write indicator, an addressing function (via the address in the preferred protocol header), a data function (in the burst of data following bytes 0 through 4 of the protocol header), and an interrupt function. These operations may be understood by examining the operation of host interface controller 135 in two contexts, the first associated with host DMA state machine 150 and described below with respect to FIG. 7, and the second associated with host-to-VBUS state machine 166 and described below with respect to FIG. 8.

Figure 7:
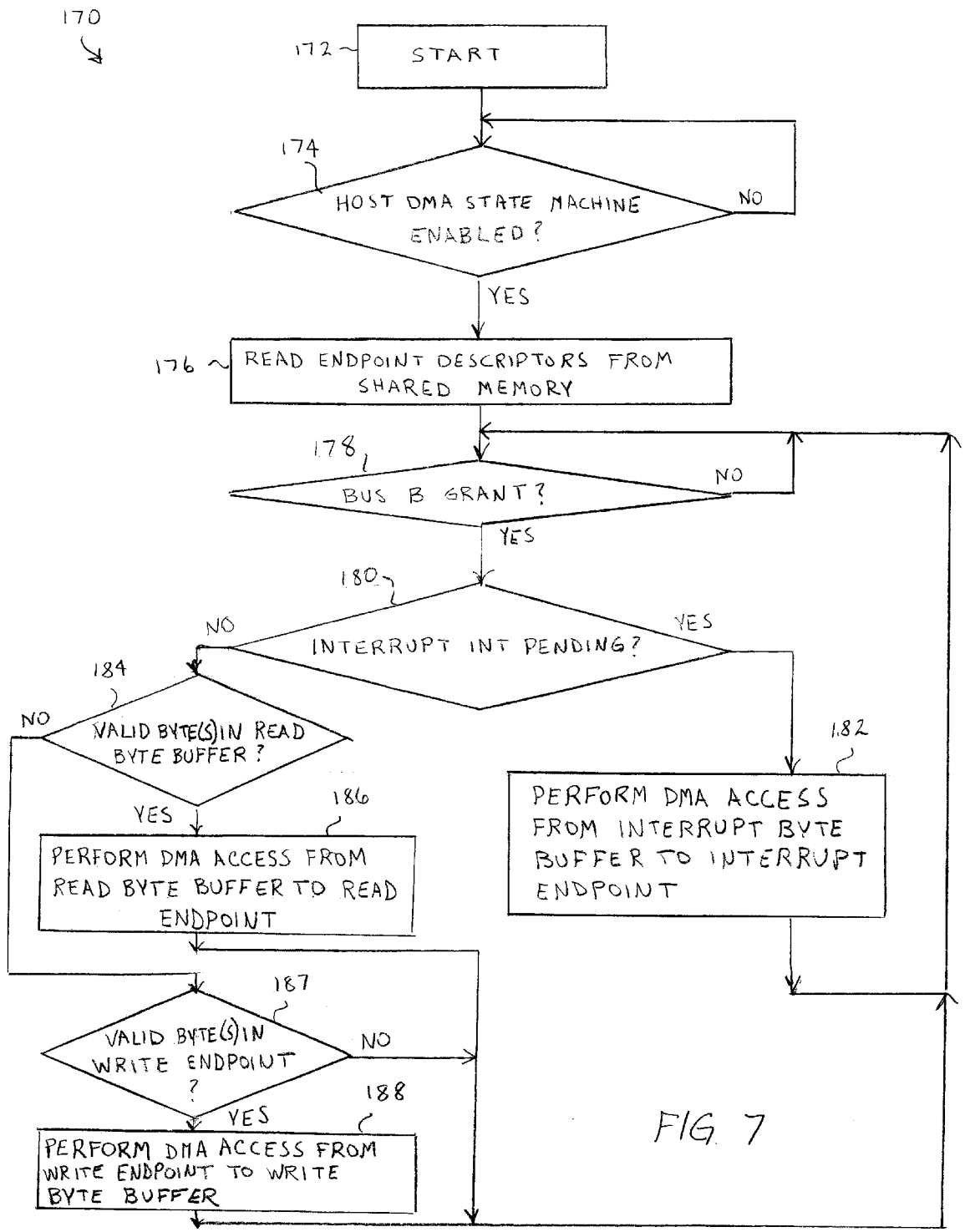
FIG. 7 illustrates a flow chart of a method of operation of host DMA state machine 150 of FIG. 5.

FIG. 7 illustrates a flow chart of a method 170 of operation of host DMA state machine 150 from FIG. 5. Method 170 commences with a start step 172 which is the default state of host DMA state machine 150 upon attachment of the device including the state machine to the USB bus (or upon reset of the device). From step 172, method 170 continues to step 174 where host DMA state machine 150 determines whether it has been enabled. Specifically, in the preferred embodiment MCU 100 enables host DMA state machine 150 once the device including that state machine has been recognized by USB host 12, and by setting the enable bit in configuration register 152 to an enabled state. Further, note at this same time that MCU 100 stores the an endpoint descriptor block pointer for each of the three dedicated endpoints 106₁, 106₂, and 106₃, into configuration register 152. If host DMA state machine 150 is not enabled, in remains in a loop by returning to step 174 until it is enabled. Once host DMA state machine 150 is enabled, method 170 continues to step 176. In step 176 host DMA state machine 150 reads the endpoint descriptor blocks from shared memory (i.e., SRAM 106), where recall the addresses of those blocks are stored in configuration register 152. Next, method 170 proceeds from step 176 to step 178.

Prior to discussing step 178 and subsequent steps, note that once host DMA state machine 150 is enabled, generally host DMA state machine 150 governs information transactions without further intervention from MCU 100. In this manner, therefore, in the preferred embodiment the protocol handling and other aspects described below are not implemented within or otherwise accommodated by MCU 100. As a result, the preferred embodiment does not unduly complicate MCU 100 or require additional hardware therein.

Step 178 acts as a wait state for host DMA state machine 150 until it receives a grant to access bus B, where the access is sought so that data may be communicated using that bus either from or to one of dedicated endpoints 106₁, 106₂, and 106₃. If no grant is currently given for bus B, then host DMA state machine 150 remains in a loop by returning to step 178 until a grant to bus B is given. In response to the bus B grant, method 170 continues from step 178 to step 180.

Step 180 represents a priority of servicing interrupts by host DMA state machine 150. Specifically, in step 180, host DMA state machine 150 determines whether an interrupt signal INT is pending. Recall from the earlier discussion of FIG. 5 that the interrupt signal INT is present when it is issued by DSP 32 to host-to-VBUS state machine 166. If an interrupt is provided in this manner, then host-to-VBUS state machine 166 reads the status information from the status register of DSP 32, where recall that the location of that register is identified by interrupt address register 168. The status information in the status register of DSP 32 in the preferred embodiment is eight bytes of data. Preferably, host-to-VBUS state machine 166 first examines the eight status bytes and determines whether the interrupt is a type that may be handled locally by controller 135, and if so the interrupt is responded to locally in an appropriate manner. Conversely, if the interrupt is such that it is desired to advise USB host 12 of the interrupt, then host-to-VBUS state machine 166 writes the first four of the eight bytes from bus VBUS into the four byte locations of interrupt byte buffer $162_{BB}$, at which time these bytes represent a pending interrupt to host DMA state machine 150. Accordingly, if such bytes are pending in interrupt byte buffer $162_{BB}$, method 170 continues from step 180 to step 182, whereas if no such interrupt data is pending, method 170 continues from step 180 to step 184.

In step 182, having been reached because the interrupt signal INT is pending and status bytes from the status register of DSP 32 have been transferred to byte buffer $162_{BB}$, then host DMA state machine 150 performs a DMA access from interrupt byte buffer $162_{BB}$ to interrupt endpoint $106_3$. Recalling that interrupt endpoint $106_3$ is an 8-byte buffer in the preferred embodiment, then the DMA transfer thereto is an 8-byte transfer. Accordingly, to begin this process, Byte Cnt2 which controls interrupt selection circuit $162_{SS}$ is set to an appropriate value to provide to host DMA state machine 150 the first status byte from interrupt byte buffer $162_{BB}$, and in response host DMA state machine 150 transfers this first status byte to a first byte location in interrupt endpoint $106_3$. To achieve this transfer, current buffer pointer 156 identifies either the X or Y buffer of interrupt endpoint $106_3$ to which the interrupt byte is written. Also during this process, buffer byte counter 158 counts the number of bytes transferred by host DMA state machine 150, so after the first transfer it indicates a count of one. This process just described for the first status byte repeats for the next seven interrupt bytes, and in this regard interrupt byte buffer $162_{BB}$ is read in a circular fashion, using interrupt selection circuit $162_{SS}$ so that a total of eight status bytes are eventually read from the four byte interrupt byte buffer $162_{BB}$ and transferred to interrupt endpoint $106_3$; moreover in this respect, host-to-VBUS state machine 166 must time its output to interrupt byte buffer $162_{BB}$ to ensure that all eight interrupt bytes are properly loaded therein so that they are timely read by host DMA state machine 150. Once eight status bytes are read, buffer byte counter 158 equals eight and is detected by host DMA state machine 150, which in response concludes the DMA transfer of the interrupt to interrupt endpoint $106_3$. Accordingly, when USB host 12 next polls interrupt endpoint $106_3$, USB host 12 is thereby notified of the posted interrupt. Also in this regard, because interrupt endpoint $106_3$ is preferably a bulk-type endpoint, then USB host 12 may quickly and efficiently read the interrupt bytes as bulk-type data, thereby avoiding the USB Specification limits that may be imposed on other endpoint types. Upon reading this interrupt data, USB host 12 may act accordingly. Returning to host DMA state machine 150, once the status data is written to interrupt endpoint $106_3$, method 170 returns from step 184 to step 178, and proceeds as described earlier with respect to that step.

In step 184, having been reached because the interrupt signal INT is not pending, host DMA state machine 150 determines whether there is one or more valid bytes in read byte buffer $160_{BB}$. If there is a valid byte(s) in read byte buffer $160_{BB}$, then method 170 continues to step 186, whereas if no such valid byte exists, then method 170 continues to step 187.

In step 186, host DMA state machine 150 performs a DMA access of the valid byte(s) from read byte buffer $160_{BB}$ to read endpoint $106_1$. The DMA access is similar in many respects to that described above relative to the DMA transfer of interrupt bytes, although in step 186 the transfer is between read byte buffer $160_{BB}$ and read endpoint $106_1$, and the number of transferred bytes may be greater. Particularly for step 186, and recalling that read endpoint $106_1$ is a 64-byte buffer in the preferred embodiment, then the DMA transfer thereto is a 64-byte transfer. To begin this process, Byte Cnt1 which controls read selection circuit $160_{SS}$ is set to an appropriate value to provide to host DMA state machine 150 the first read byte from byte buffer $160_{BB}$, and in response host DMA state machine 150 transfers this first read byte to a first byte location in read endpoint $106_1$, where current buffer pointer 156 identifies either the X or Y buffer of read endpoint $106_1$ to which the interrupt byte is written and buffer byte counter 158 counts the number of read bytes transferred by host DMA state machine 150. This process repeats and in theory could pass up to 64 bytes to read endpoint $106_1$; however, the 32 byte limit imposed by the data burst field in the protocol header of FIG. 6 in practice limits the likely transfer to 37 bytes (i.e., 5 bytes of protocol header followed by 32 bytes of data). Further, this transfer reads read byte buffer $160_{BB}$ in a circular fashion using interrupt selection circuit $160_{SS}$ so that the appropriate total number of read bytes are eventually transferred, and also during this process host-to-VBUS state machine 166 must time its output to read byte buffer $160_{BB}$ to ensure that up to 37 read bytes are timely loaded into read byte buffer $160_{BB}$ so that they are timely read by host DMA state machine 150. Once the proper number of read bytes is passed to read endpoint $106_1$, buffer byte counter 158 equals the number of those bytes, and that number may be communicated to UBM 116 and thereby made available to SIE 114. Given this number, SIE 114 may transmit this number of bytes in a packet to USB host 12. Lastly, once the DMA transfer of step 186 is complete, method 170 returns from step 186 to step 178.

In step 187, having been reached because there is no valid in read byte buffer $160_{BB}$, then host DMA state machine 150 determines whether there is one or more valid bytes in write endpoint $106_2$. This indication is provided via a control signal from UBM 116. If there is a valid byte(s) in write endpoint $106_2$, then method 170 continues to step 188, whereas if no such valid byte exists, then method 170 returns from step 187 to step 178.

In step 188, host DMA state machine 150 performs a DMA access of the valid byte(s) from write endpoint $106_2$ to write byte buffer $162_{BB}$. The DMA access is similar in many respects to that described above relative to the DMA transfer of read bytes and, thus, is only briefly examined here while one skilled in the art should appreciate the comparable aspects to the preceding discussion. In step 188, up to 64 bytes may be transferred by host DMA state machine 150 from write endpoint $106_2$ to write byte buffer $162_{BB}$, although again the limits of the FIG. 6 protocol practically restrict the transfer to a total of 37 bytes. The actual number of bytes transferred is preferably provided to host DMA state machine 150 by UBM 116 which indicates at the handshake level a number of valid bytes in write endpoint $106_2$. Indeed, in the preferred embodiment DMA state machine 150 does not discern the type of information in the accessed bytes, for example, whether those bytes are part of the protocol header or the subsequent data bytes; instead, host DMA state machine 150 merely transfers the information with the header analysis to be performed as detailed later. The transfer is from either the X or Y buffer of write endpoint $106_2$, as indicated by current buffer pointer 156, and the number of transferred bytes is maintained by buffer byte counter 158. The writing to write buffer 164$_{BB}$ is in a circular fashion, using selection circuit 164$_{SS}$ to direct the bytes accordingly in response to the Byte Cnt3 value. Also during this process, host-to-VBUS state machine 166 times its input from write byte buffer 164$_{BB}$ to ensure that up to 37 read bytes are timely read from write byte buffer 164$_{BB}$ and communicated to bus VBUS as further detailed below. Once the proper number of write bytes is read from write endpoint 106$_2$, the DMA transfer of step 188 is complete and method 170 returns from step 188 to step 178.

Figure 8:
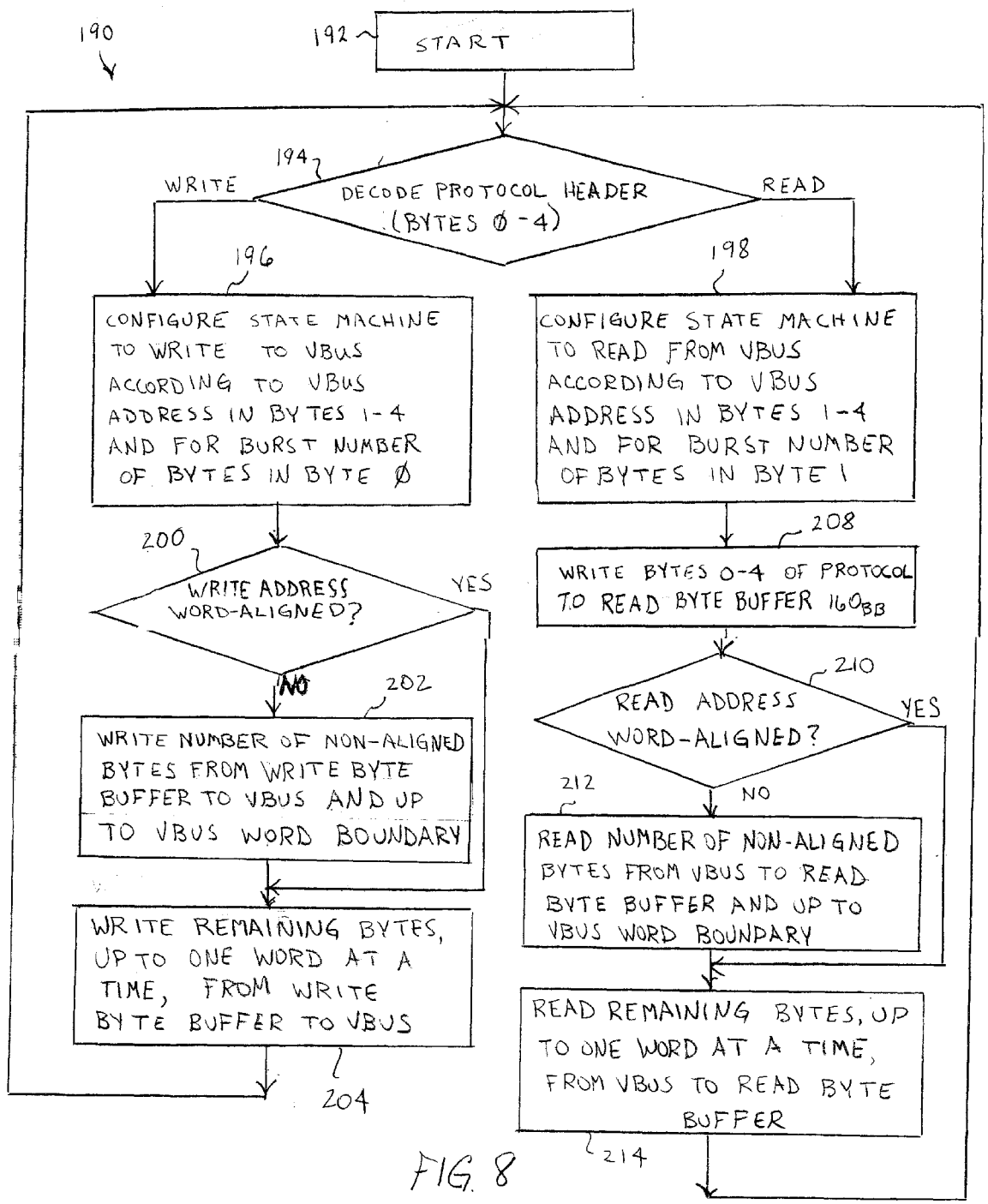
FIG. 8 illustrates a flow chart of a method of operation of host-to-VBUS state machine 166 of FIG. 5.

FIG. 8 illustrates a flow chart of a method 190 of operation of host-to-VBUS state machine 166 from FIG. 5. By way of introduction, the illustration of FIG. 8 is directed to the relationship of host-to-VBUS state machine 166 and its performing information transfers relative to the preferred protocol header of FIG. 6, and as an interface between bus VBUS and byte buffers 160$_{BB}$ and 164$_{BB}$ (with interrupt byte buffer 162$_{BB}$ having been described above). Also, recall it was noted earlier that host-to-VBUS state machine 166 may actually comprise more than one machine in implementation; for example, a first state machine may interface with byte buffers 160$_{BB}$, 162$_{BB}$, and 164$_{BB}$, while a second state machine, in communication with the first state machine, may interface and arbitrate with bus VBUS. To simplify the remaining discussion, however, the operation is described as an overall single state machine while one skilled in the art may readily ascertain additional details that arise from implementing separate state machines.

Method 190 commences with a start step 192 which is the default state of host-to-VBUS state machine 166 upon attachment of the device including the state machine to the USB bus (or upon reset of the device). From step 192, method 190 continues to step 194 where host-to-VBUS state machine 166 decodes the first five bytes of a USB packet as provided by host DMA state machine 150 from write endpoint 106$_2$. These first five bytes, as detailed earlier in connection with FIG. 6, form a protocol header consisting of a read/write indicator, a burst length in bytes, and an address for bus VBUS. At this point, recall that USB host 12 according to the preferred embodiment may transmit a request to modem 14 either to read data from, or write data to, the memory space of DSP 32 (as specified by the VBUS address), where the request is in the form of the FIG. 6 header and is communicated by USB host 12 to write endpoint 106$_2$; step 194 identifies and begins the response to this request by decoding the header. The decoded information determines the subsequent steps for the remainder of method 190. Specifically, if decode step 194 determines that the read/write indicator specifies a write (by USB host 12), then method 190 continues to step 194; to the contrary, if decode step 194 determines that the read/write indicator specifies a read (by USB host 12), then method 190 continues to step 198. Each of these alternative paths is described below.

In step 196, having been reached because a write is specified in the host interface protocol header, host-to-VBUS state machine 166 is configured to write subsequently received data bytes to bus VBUS. More particularly, a burst number of data bytes as specified in byte 0 of the host interface protocol header, and which will follow the header in the sequence of bytes from write endpoint 106$_2$, are directed to be written to bus VBUS, starting at the address in bytes 1 through 4 of the host interface protocol header. Next, method 190 continues from step 196 to step 200 and additional steps are taken to write the data bytes according to the step 196 configuration.

In step 200 host-to-VBUS state machine 166 determines whether the bus VBUS address specified in the host interface protocol header is a word-aligned address; in other words, in the preferred embodiment, the bus VBUS address may be to any byte address in the bus VBUS address space, whether the byte is either word-aligned or is not word-aligned. If the write address (i.e., the bus VBUS address specified in the host interface protocol header) is not word-aligned, method 190 continues from step 200 to step 202, whereas if the write address is word-aligned, method 190 continues from step 200 to step 204.

In step 202, having been reached due to a non-word-aligned write address, host-to-VBUS state machine 166 writes less than one word of bytes (i.e., four bytes) starting at the bus VUBS address specified in the protocol header. The actual number of bytes written in this step is constrained in two manners. First, only enough bytes are written to complete the word which includes the bus VBUS address specified in the protocol header. Second, if the data burst size in the protocol header is less than four, then the number of bytes written to complete the word is equal to or less than the data burst size. In any event, one skilled in the art will appreciate that by writing less than four bytes to an address location, the non-written lower-address bytes remain unaffected; thus, the preferred embodiment supports writes which do not end-on a 32-bit boundary. Finally, note in connection with the write to bus VBUS that host-to-VBUS state machine 166 includes sufficient circuitry (e.g., a second state machine) to properly arbitrate access to bus VBUS so that the burst size number of bytes is written to bus VBUS at a proper time. Following step 202, method 190 continues to step 204.

In step 204, having been reached because the next byte to be written from write byte buffer 164$_{BB}$ is to be written to the beginning location of a word on the bus VBUS address space, host-to-VBUS state machine 166 writes the remaining bytes from the current set of bytes, as communicated from write endpoint 106$_2$ to write byte buffer 164$_{BB}$, to bus VBUS. During each step 204 write, host-to-VBUS state machine 166 writes up to four bytes (i.e., one word) at a time, so long as there is at least four such bytes remaining in write byte buffer 164$_{BB}$. Further in this regard, in the preferred embodiment host-to-VBUS state machine 166 maintains a byte counter which after the decode operation of step 194 is loaded with the burst size from the protocol header, and which is decreased in count for each transferred byte by either step 202 or each additional byte transfer by step 204. Thus, step 204 continues to transfer bytes, up to one word at a time, until the counter equals zero. Under this approach, therefore, entire words are transferred each time, until the last transfer includes either an entire word or a set of less than four bytes. In addition, host-to-VBUS state machine 166 maintains an address register or the like which is increased according to each byte or byte transferred by steps 202 and 204 to ensure a write to the proper address on bus VBUS. Further, this step, like step 202, is performed with proper arbitration to access bus VBUS so that the four (or less) data bytes are written to bus VBUS at a proper time. If the last set of transferred bytes includes less than four bytes, then the non-written higher-address bytes in the word addressed by the then current VBUS address word remain unaffected; thus, the preferred embodiment supports writes which do not end on a 32-bit boundary. Once all bytes are written by the conclusion of step 204, method 190 returns from step 204 to step 194.

Returning now to step 196, recall that it transfers the method flow to step 198 when a read indication is decoded in byte 0 of the host interface protocol header, and step 198 and its following steps are now explored in greater detail. In step 198, host-to-VBUS state machine 166 is configured to read the host-requested data bytes from bus VBUS. More particularly, step 198 prepares and performs a read of a burst number of data bytes from bus VBUS, where the number of data bytes is specified in byte 0 of the host interface protocol header and the data bytes start at the address specified in bytes 1 through 4 of the host interface protocol header. Next, method 190 continues from step 198 to step 208.

In step 208, host-to-VBUS state machine 166 provides a 5-byte host interface host protocol header to host DMA state machine 150 (via read byte buffer $160_{BB}$) and the latter then writes the header to read endpoint $106_1$. More particularly, step 208, having been reached in response to a request by USB host 12 to read data from modem 14, begins the response of providing the requested data and in this regard first inserts a protocol header which will reach and be read by USB host 12 before it receives the data it requested. As a result, when USB host 12 next reads one or more bytes from read endpoint $106_1$, those bytes first begin with a proper header in the format of FIG. 6, followed by one or more data bytes. Further, when step 208 forms its protocol header, that header includes the same information in the protocol header written by USB host 12 in its previous read request. As a result, when USB host 12 reads the step 208 header from read endpoint $106_1$, it is informed that it is receiving a same burst number of data bytes that it earlier requested from the function and starting at the same address to which the earlier request was directed. Next, method 190 continues from step 208 to step 210.

In step 210, host-to-VBUS state machine 166 operates in the same general manner as described above relative to step 200, where here however the step is directed to a read rather than a write. Thus, in step 210, host-to-VBUS state machine 166 determines whether the bus VBUS address specified in the host interface protocol header is a word-aligned address. If the read address is not word-aligned, method 190 continues from step 210 to step 212, whereas if the address is word-aligned, method 190 continues from step 210 to step 214.

In step 212, having been reached due to a non-word-aligned read address, host-to-VBUS state machine 166 reads less than one word of bytes (i.e., four bytes) starting at the bus VUBS address specified in the protocol header, and host-to-VBUS state machine 166 transfers the bytes to read byte buffer $160^{BB}$. The actual number of bytes read in this step is constrained in two manners. First, only enough bytes are read to complete the word which includes the bus VUBS address specified in the protocol header. Second, if the data burst size in the protocol header is less than four, then the number of bytes read is equal to or less than the data burst size. Thus, the preferred embodiment supports reads of bytes which do not begin on a 32-bit boundary. Finally, note in connection with the read from bus VBUS that host-to-VBUS state machine 166 includes sufficient circuitry (e.g., a second state machine) to properly arbitrate access to bus VBUS so that the burst size number of bytes is read from bus VBUS at a proper time. Following step 212, method 190 continues to step 214.

In step 214, having been reached because the next byte to be read from bus VBUS and transferred to read byte buffer $160_{BB}$ is to be read from a beginning location of a word on the bus VBUS address space, host-to-VBUS state machine 166 reads from bus VBUS the remaining bytes from the current set of bytes, and communicates the bytes to read buffer $160_{BB}$ from where they are transferred by host DMA state machine 150 to read endpoint $106_1$. During each step 214 read, host-to-VBUS state machine 166 reads up to four bytes (i.e., one word) at a time, so long as there are at least four such bytes remaining to be read from the bus VBUS address space. Further in this regard, in the preferred embodiment host-to-VBUS state machine 166 maintains a byte counter which is loaded with the burst size from the protocol header that was written in step 208, and which is decreased in count for each transferred byte by either step 212 or each byte additional transferred by step 214. Thus, step 214 continues to transfer bytes, up to one word at a time, until the counter equals zero. Under this approach, therefore, entire words are transferred each time, until the last transfer includes either an entire word or a set of less than four bytes. In addition, host-to-VBUS state machine 166 maintains an address register or the like which is increased according to each byte or byte transferred by steps 212 and 214 to ensure a read from the proper address on bus VBUS. Further, this step, like step 212, is performed with proper arbitration to access bus VBUS so that the four data bytes are read from bus VBUS at a proper time. Once all bytes are read by the conclusion of step 214, method 190 returns from step 214 to step 194.

Having detailed various aspects of the preferred embodiment, some additional observations may be made in connection with the operation of system 10 when implemented with the preferred embodiments, as explored below.

A first additional observation in connection with the preferred embodiment is noteworthy about the order in which DMA transfers are prioritized arising from steps 184 through 188 of FIG. 7, having now further understood the relationship of the transferred data by host-to-VBUS state machine 166. First, steps 180 and 182 give first priority to pending interrupts. Second, as between a read by USB host 12 and a write to USB host 12, steps 184 through 188 give second priority to data in read byte buffer $160^{BB}$. To further appreciate this latter priority, one skilled in the art should now understand the data is put in read byte buffer $160^{BB}$ only in response to an earlier request by USB host 12 to read such data. Thus, if USB host 12 first writes such a request to host interface controller 135, and then second follows that request with an additional write to endpoint $106_2$, the initial request causes data to be loaded into read byte buffer $160_{BB}$ and that data is first provided by host DMA state machine 150 to read endpoint $106_1$ before the second action by USB host 12 (i.e., the additional write to endpoint $106_2$) is serviced. However, if USB host 12 sends successive writes to write endpoint $106_2$ that are not read requests, then those writes are serviced in the order in which they are received by the X and Y buffers of write endpoint $106_2$.

A second additional observation in connection with the preferred embodiment arises relative to the preferred hardware implementation. Specifically, host interface controller 135 has been shown to support a host interface protocol which permits each of a read, write, and interrupt functionality between USB host 12 and a USB function. These functionalities may be achieved using a reasonable number of circuit gates and preferably in a manner so as not to appreciably affect a separate USB controller (e.g., MCU 100). Thus, the separate USB controller may be obtained from various sources, and if it is a processor, its firmware is generally not complicated by the additional functionality performed in the preferred embodiment by a separate host interface controller 135, whereas if it is formed using logic circuitry, then the complexity of such circuitry should not require considerable, if any, alteration to accommodate the preferred embodiment which may be implemented in the separate host interface controller 135 as shown and described above.

A third additional observation is that while the preferred embodiment has been shown to provide the preferred protocol associated with three different dedicated endpoints, one skilled in the art may use the present inventive teachings to form alternative embodiments with either a subset of the three dedicated endpoints, or still additional ones as well. However, the preferred embodiment as detailed above provides both read and write capability, and also incorporates the interrupt functionality so that device notification also may be effected at a greater rate than using interrupt-type endpoints.

A fourth additional observation is that the preferred embodiment implementation of dedicated endpoints in combination with the protocol may vastly improve data throughput. For example, as mentioned earlier in the Background Of The Invention section of this document, in current USB systems data transfers are typically communicated according to the data type; for example, control transfers from host to function are accomplished by the host communicating control data to a control-type endpoint in the function. However, according to the preferred embodiment, the host may transmit control data, following the preferred host interface protocol header, to the dedicated write endpoint $106_2$. This aspect is particularly beneficial in that limitations typically imposed by the USB Specification may be avoided by using the preferred host interface protocol. For example, a control transfer to a control-type endpoint is limited by the USB Specification to not exceed more than eight bytes of control data. However, recall under the preferred embodiment that write endpoint $106_2$ is a bulk-type endpoint; accordingly, under the preferred embodiment up to 32 bytes of control data may be sent in a single packet to write endpoint $106_2$, so long as that data is properly preceded with the preferred host interface protocol header. Thus, an increase in four times the amount of data is provided. Still further, control packets according to the USB Specification are required to have considerable overhead. In contrast, by communicating control data to the dedicated bulk-type write endpoint $106_2$, this use of overhead is also minimized, thereby significantly improving effective data throughput.

A fifth additional observation is that while the preferred embodiment implementation uses a bulk-type endpoint for the dedicated endpoints $106_1$, $106_2$, and $106_3$, any or all of those endpoints also could be made to be another type of endpoint other than a control endpoint and thereby still have benefits in contrast to the limitations imposed on a control endpoint. For example, any of endpoints $106_1$, $106_2$, and $106_3$ could be isochronous-type endpoints. Isochronous endpoints are limited to one packet per 1 millisecond USB frame, but the packet still may have a very large number of bytes as compared to a control endpoint (i.e., 1024 bytes in isochronous as opposed to the 8 data bytes in a control packet). Nonetheless, a bulk-type for any of endpoints $106_1$, $106_2$, and $106_3$ may well be preferred because, while the number of bytes per bulk frame is limited to 64 bytes, the number of frames per packet for bulk data is limited only by available bandwidth. As still another benefit of the preferred protocol into an endpoint other than a control endpoint, the preferred embodiment permits the specification of a 32-bit (or larger in an alternative embodiment) address while the USB Specification only discloses a 16-bit address submitted to a control endpoint.

A sixth additional observation is that the preferred embodiment is extremely versatile due to the high data rate supported and the relative ease at which a USB host may access a USB function. This flexibility should support numerous applications, including application-specific embodiments.

A seventh additional observation is while the present embodiments have been described in detail, various substitutions, modifications or alterations could be made to the descriptions set forth above, as has been suggested further by various examples. Indeed, the present teachings may be expanded further by other variations thereto. For example, while the data transfer according to the preferred embodiment has been limited to 32 bytes, a larger or smaller number may be implemented. As still another example, the protocol header of FIG. 6 could be modified to include additional information. As yet another example, while host interface controller 135 and function card 28 have been shown by way of example as associated with modem 14, these same or comparable devices may be used with other USB functions in system 10, or still others not shown. Finally, still other examples will be ascertainable by one skilled in the art and, thus, the preceding has generally set forth the present preferred embodiments, but such other changes may be made thereto without departing from the inventive scope which is defined by the following claims.

What is claimed is:

1. A USB function device for coupling to a USB host, comprising:

circuitry for providing a capability to the USB host, and comprising an address space; and a USB interface circuit coupled between the USB host and the circuitry for providing a capability to the USB host, the USB interface circuit comprising:

a memory area comprising a write endpoint accessible to the USB host for writing a plurality of bytes to the memory area via the write endpoint, wherein the plurality of bytes comprises data information and protocol information and wherein the write endpoint comprises an endpoint-type other than a control-type endpoint; and circuitry for decoding the protocol information; and circuitry for communicating the data information to the address space in response to the protocol information.

2. The USB function device of claim 1 wherein the protocol information comprises an indicator that the USB host is writing the data information to the USB function device.

3. The USB function device of claim 1 wherein the protocol information comprises an indicator of a quantity of the data information.

4. The USB function device of claim 1 wherein the protocol information comprises an address corresponding to the address space.

5. The USB function device of claim 4 wherein the address comprises at least 32 bits.

6. The USB function device of claim 1 wherein the protocol information comprises:

an indicator that the USB host is writing the data information to the USB function device;

an indicator of a quantity of the data information; and an address corresponding to the address space.

7. The USB function device of claim 1 and wherein the USB interface circuit further comprises a DMA circuit for performing a DMA access of the plurality of bytes from the memory area to a buffer, wherein the buffer is accessible by the circuitry for decoding the protocol information.

8. The USB function device of claim 1 wherein the write endpoint comprises a bulk-type endpoint.

9. The USB function device of claim 8 wherein the data information comprises control data information.

10. The USB function device of claim 1 wherein the write endpoint comprises an isochronous-type endpoint.

11. The USB function device of claim 1:
wherein the memory area comprises a first memory area;
wherein the plurality of bytes comprise a first plurality of bytes;
wherein the protocol information comprises first protocol information;
wherein the data information comprises first data information;
and wherein the USB interface circuit further comprises:
a second memory area comprising a read endpoint accessible by the USB host for reading a second plurality of bytes from the second memory area via the read endpoint;
circuitry for inserting into the second plurality of bytes second protocol information to be read by the USB host; and
circuitry for including second data information in the second plurality of bytes to be read by the USB host, wherein the second data information is from the address space.

12. The USB function device of claim 11 wherein the second protocol information host comprises an indicator that the USB host is receiving data information from the USB function device.

13. The USB function device of claim 11 wherein the second protocol information comprises an indicator of a quantity of the second data information.

14. The USB function device of claim 11 wherein the second protocol information comprises an address corresponding to the address space and identifies a beginning address for the second data information.

15. The USB function device of claim 14 wherein the address comprises at least 32 bits.

16. The USB function device of claim 11:
wherein the second protocol information host comprises an indicator that the USB host is receiving data information from the USB function device;
wherein the second protocol information comprises an indicator of a quantity of the second data information; and
wherein the second protocol information comprises an address corresponding to the address space and identifies a beginning address from which the second data information was copied.

17. The USB function device of claim 11 wherein the read endpoint comprises an endpoint-type other than a control-type endpoint.

18. The USB function device of claim 11 and wherein the USB interface circuit further comprises a DMA circuit, wherein the DMA circuit is for:
performing a DMA access of the first plurality of bytes from the first memory area to a first buffer, wherein the first buffer is accessible by the circuitry for decoding the protocol information; and
performing a DMA access of the second plurality of bytes from a second buffer to the second memory area, wherein the second buffer is loaded from the address space.

19. The USB function device of claim 11 wherein the write endpoint comprises a bulk-type endpoint.

20. The USB function device of claim 19 wherein the first data information comprises control data information.

21. The USB function device of claim 11 wherein the read endpoint comprises a bulk-type endpoint.

22. The USB function device of claim 21 wherein the second data information comprises control data information.

23. The USB function device of claim 11 wherein the read endpoint comprises an isochronous-type endpoint.

24. The USB function device of claim 11 wherein each of the write endpoint and the read endpoint comprises a bulk-type endpoint.

25. The USB function device of claim 24 wherein each of the first data information and the second data information comprises control data information.

26. The USB function device of claim 11 wherein each of the write endpoint and the read endpoint comprises an isochronous-type endpoint.

27. The USB function device of claim 11 and wherein the USB interface circuit further comprises:
a third memory area comprising an endpoint for storing an interrupt and accessible by the USB host for reading interrupt information via the endpoint for storing an interrupt; and
circuitry for inserting the interrupt notification into the endpoint for storing an interrupt.

28. The USB function device of claim 11 wherein the endpoint for storing an interrupt comprises an endpoint-type other than a control-type endpoint.

29. The USB function device of claim 28 wherein the endpoint for storing an interrupt comprises a bulk-type endpoint.

30. The USB function device of claim 28 wherein the endpoint for storing an interrupt comprises an isochronous-type endpoint.

31. A USB system, comprising:
a USB host;
a plurality of function devices for coupling to the USB host, wherein at least one of the plurality of function devices comprises:
circuitry for providing a capability to the USB host, and comprising an address space; and
a USB interface circuit coupled between the USB host and the circuitry for providing a capability to the USB host, the USB interface circuit comprising:
a memory area comprising a write endpoint accessible to the USB host for writing a plurality of bytes to the memory area via the write endpoint, wherein the plurality of bytes comprises data information and protocol information and wherein the write endpoint comprises an endpoint-type other than a control-type endpoint; and
circuitry for decoding the protocol information; and
circuitry for communicating the data information to the address space in response to the protocol information.

32. The USB system of claim 31:
wherein the memory area comprises a first memory area;
wherein the plurality of bytes comprise a first plurality of bytes;
wherein the protocol information comprises first protocol information;
wherein the data information comprises first data information;
and wherein the USB interface circuit of the at least one of the plurality of function devices further comprises:
a second memory area comprising a read endpoint accessible by the USB host for reading a second plurality of bytes from the second memory area via the read endpoint;
circuitry for inserting into the second plurality of bytes second protocol information to be read by the USB host; and circuitry for including second data information in the second plurality of bytes to be read by the USB host, wherein the second data information is from the address space.

33. The USB system of claim 32 wherein the read endpoint comprises an endpoint-type other than a control-type endpoint.

34. A method of operating a USB function device to communicate with a USB host, the USB function device comprising circuitry for providing a capability to the USB host wherein the circuitry for providing a capability has an address space, the method comprising the steps of:

receiving a plurality of bytes from the USB host into a memory area comprising a write endpoint accessible to the USB host, wherein the plurality of bytes comprises data information and protocol information and wherein the write endpoint comprises an endpoint-type other than a control-type endpoint;

decoding the protocol information; and in response to the decoding step, communicating the data information to the address space.

35. The method of claim 34 wherein the write endpoint comprises a bulk-type endpoint, and the plurality of bytes received from the USB host includes a read endpoint.

36. The method of claim 34:

wherein the memory area comprises a first memory area;

wherein the plurality of bytes comprise a first plurality of bytes;

wherein the protocol information comprises first protocol information;

wherein the data information comprises first data information;

and wherein the method further comprises writing a second plurality of bytes into a second memory area comprising a write endpoint accessible by the USB host, wherein the second plurality of bytes comprises second data information and second protocol information.

37. The method of claim 35 wherein the read endpoint comprises an endpoint-type other than a control-type endpoint.

38. The method of claim 35 wherein the read endpoint comprises a bulk-type endpoint.

* * * * *